May 4, 1965   M. P. HOGUE   3,182,111
SUMP CONSTRUCTION FOR A FOOD WASTE DISPOSER
Filed July 31, 1962   2 Sheets-Sheet 1

INVENTOR.
MARCUS P. HOGUE
BY Richard C. Caslin
HIS ATTORNEY

May 4, 1965   M. P. HOGUE   3,182,111
SUMP CONSTRUCTION FOR A FOOD WASTE DISPOSER
Filed July 31, 1962   2 Sheets-Sheet 2
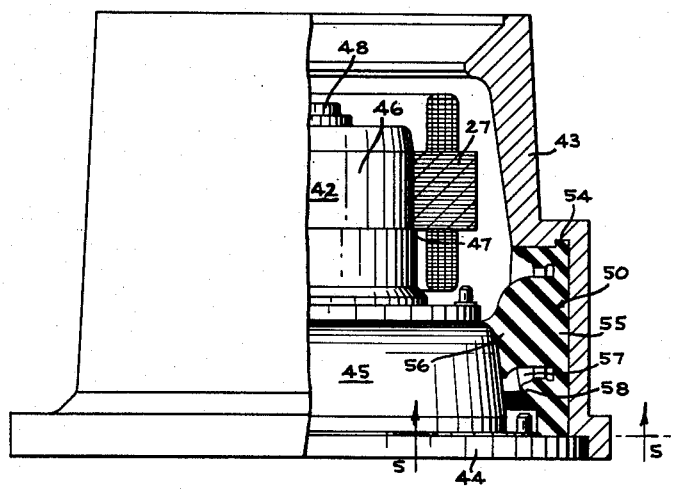
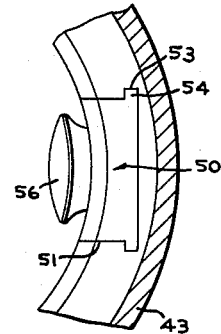
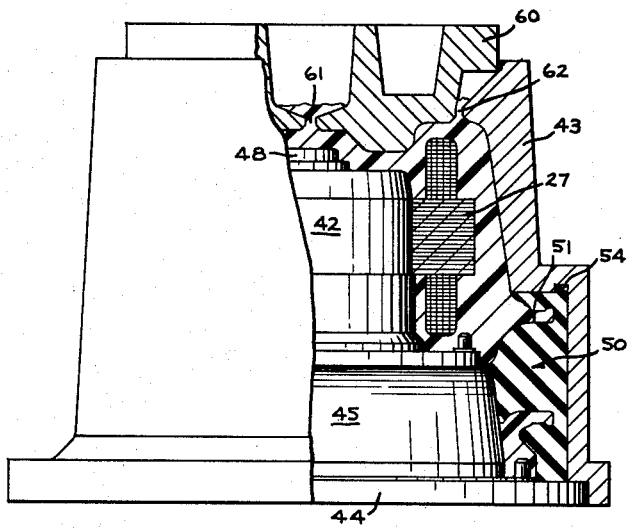
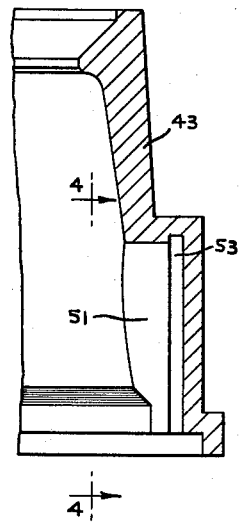
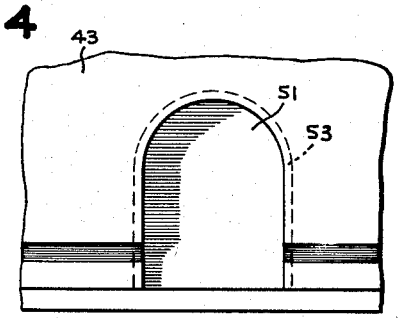
INVENTOR.
MARCUS P. HOGUE
BY Richard L. Caslin
HIS ATTORNEY

3,182,111
SUMP CONSTRUCTION FOR A FOOD WASTE DISPOSER

Marcus P. Hogue, Hendersonville, N.C., assignor to General Electric Company, a corporation of New York
Filed July 31, 1962, Ser. No. 213,686
3 Claims. (Cl. 264—272)

This invention relates to the construction of the sump for a food waste disposer, and particularly to a method of molding the sump with a smooth surfaced hole through the side wall of the sump to serve as the drain outlet.

This invention is related to my copending application Serial No. 209,663, filed July 13, 1962, and entitled Encapsulated Motor For Waste Disposal Apparatus, which is assigned to the General Electric Company, assignee of the present invention. The invention in the above-cited copending application deals with a design of an encapsulated motor for use with a food waste disposer where the sump is formed as an extension of the top of the molded motor housing. The present invention relates to a simplified means for molding the sump with a drain hole formed in the side wall thereof.

The principal object of the present invention is to provide a molded hollow member with an opening in its side wall which is formed during the molding operation and which does not complicate the design of the mold.

A further object of the present invention is to design a molding technique using a resilient insert that is slidable within the mold for forming a hole through the side wall of the finished casting.

Briefly stated, in accordance with one aspect of this invention, I provide a pan-shaped sump that is molded on a center plug assembly that defines the interior of the sump. An outer mold shell is assembled over the center plug and defines a mold cavity therewith into which the molding compound is to be introduced. A resilient insert is first assembled along one side wall of the mold shell and is capable of sliding removal from the shell. Accordingly, when the molding compound has been introduced into the mold and the compound cured so it solidifies into a completed casting, the outer mold shall may be removed from the casting and in so doing the insert is stripped automatically from the mold shell. This stripping action is caused by the insert being confined within the casting. Next, the casting is separated from the center plug and finally the insert is separated from the casting to provide the desired opening in the side wall thereof.

My invention will be better understood from the following description taken in conjunction with the accompanying drawings and its scope will be pointed out in the appended claims.

FIGURE 2 is an elevational view of the mold for casting a combined motor housing and sump of the present invention showing a resilient insert compressed between the center plug assembly and the outer mold shell;

FIGURE 3 is a fragmentary cross-sectional elevational view of the outer mold shell in the area of the pocket for supporting the insert;

FIGURE 4 is a fragmentary front elevational view of the pocket for the insert in the outer mold shell taken on the line 4—4 of FIGURE 3;

FIGURE 5 is a bottom plan view of a fragment of the outer mold shell showing the insert supported in the side wall thereof and taken on the line 5—5 of FIGURE 2; and FIGURE 6 is a cross-sectional elevational view similar to that of FIGURE 2 after the mold has been filled with the molding compound.

Figure 1:
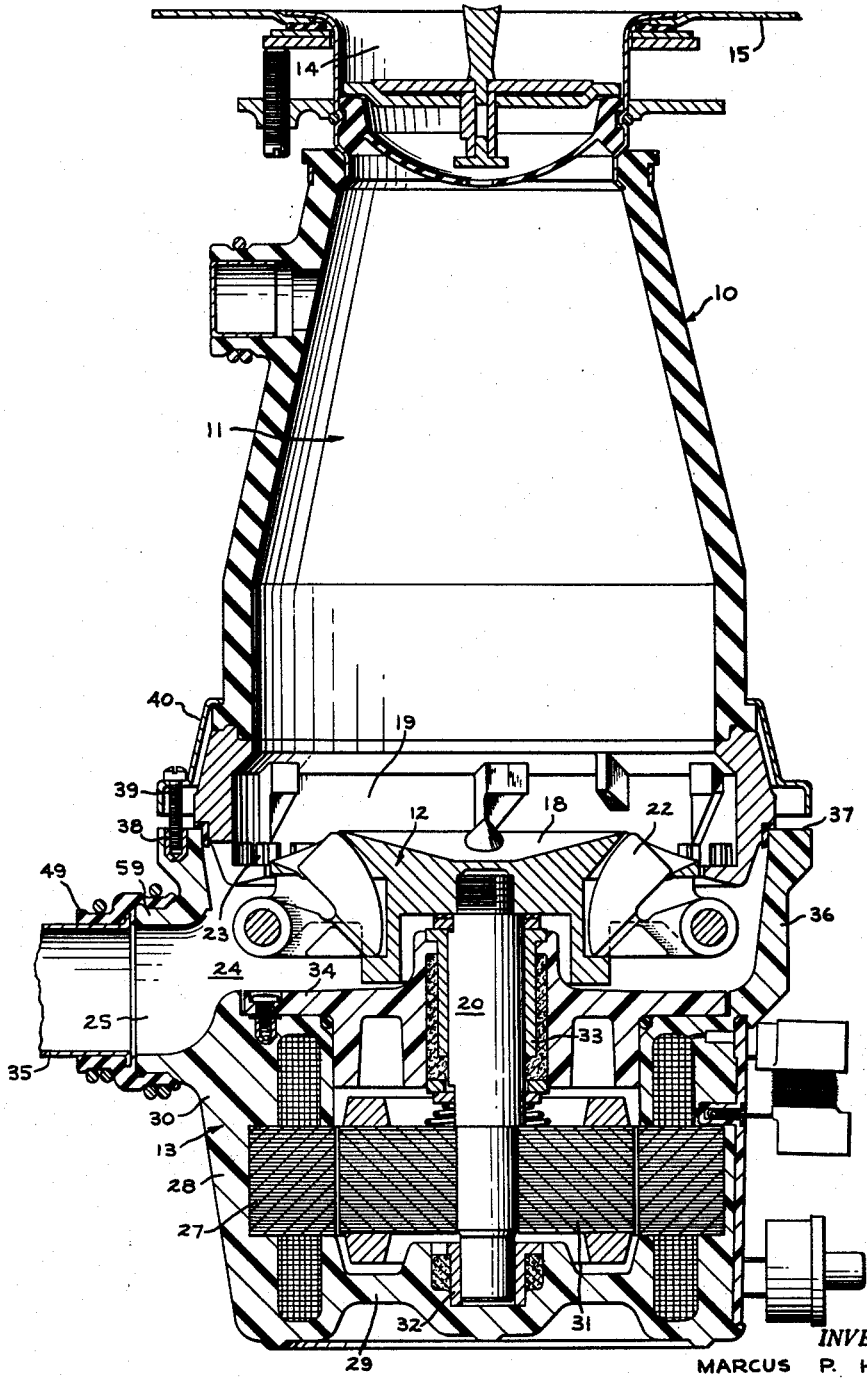
FIGURE 1 is a cross-sectional elevational assembly view of a food waste disposer embodying the present invention.

Turning to a consideration of the drawings and in particular to FIGURE 1, there is shown a detailed illustration of one embodiment of the present invention incorporated in a food waste disposer 10. The disposer design will be described briefly in order to orient the invention in the art in which it will be used in production. The food waste disposer 10 comprises three main elements; namely, (1) a cylindrical hopper 11, (2) a rotatable comminuting means 12 located adjacent the bottom of the hopper, and (3) a lower motor assembly 13 for driving the comminuting means. The hopper 11 that has been illustrated is a tubular member of molded elastomeric material of relatively heavy thickness. The hopper is formed in the shape of a truncated cone, that is, it is tapered slightly inwardly from bottom to top so that the opening at its bottom end is somewhat larger than the top opening. The general nature of this rubber-like hopper 11 is discussed in the Brezosky et al. Patent 2,743,875, which issued on May 1, 1956, and is assigned to the General Electric Company, assignee of the present invention. The upper end of the hopper 11 is designed to be suspended from the drain opening or sink flange 14 of a typical kitchen sink 15. Since this suspension means forms no part of the present invention it will not be discussed here in detail.

The particular comminuting means 12 is also outside of the present invention but for purposes of illustration it is shown patterned after the teachings in the Jenkins Patent 3,005,595, which issued on October 24, 1961, and is also assigned to the General Electric Company, assignee of the present invention. This comminuting means is made up of two major elements, namely, a rotatable flywheel 18 and a stationary shredding ring 19 arranged concentrically therewith. The flywheel 18 is mounted on the top of the vertical shaft 20 of the motor 13, while the shredding ring 19 is sandwiched between the lower end of the hopper 11 and the upper end of the motor housing 13. The flywheel 18 includes impeller means in the form of pivoted hammers 22 which are retracted automatically when the flywheel is stationary, as shown, but which are swung outwardly by centrifugal force when the flywheel is rotated to impel the water and food waste in the hopper outwardly against the shredding ring 19. In order to prevent the food waste from clogging up the system, the unit is always supplied with a flow of water during its operation. The water serves as a carrier to carry off the food waste that has been ground to a size fine enough to be able to pass through drain openings 23 in the shredding ring and into a sump 24. As shown, the sump is located below the shredding ring and the flywheel to serve as a reservoir for receiving the food waste entrained in the water and to direct the effluent out through a drain opening 25 in the side wall of the sump. There is nothing new in having a sump located below the comminuting means of a food waste disposer or to provide such a sump with a drain opening, but it is believed that an important contribution has been made in the method of providing the side wall of the sump with the opening 25 during the molding operation of the sump, as will be fully explained hereinafter.

Before discussing the detailed views of the invention of FIGURES 2–6, a brief mention will be made of the construction of the motor 13 which is fully disclosed and claimed in my copending application Serial No. 209,663 that was cited above. The motor 13 is shown as an induction motor comprising a wound stator 27 of annular shape encapsulated in a suitable molding compound such as an epoxy resin to form a molded motor housing 28 that is of generally bucket-shape having a bottom wall 29 and a generally vertical cylindrical side wall 30. The interior of the motor housing is generally filled by a wound rotor 31 which is provided with the vertical shaft 20 that was mentioned previously as having its top portion fastened to the flywheel 18. The shaft is supported by a lower bearing 32 formed in the bottom wall 29 of the motor housing and by an upper bearing 33 that is positioned in a removable end bell 34 that is fastened over the open top of the rotor cavity within the bucket-shaped motor housing 28. As is clear from the drawing this removable end bell 34 also serves as the floor for the sump 24. Particular attention must be given to the necessity for preventing moisture for entering the motor under any circumstances. Thus special seals and gaskets are employed to prevent moisture from entering the motor through and around the upper motor bearing 33 and also under the removable end bell 34. These precautions will not be discussed here in more detail as they do not form part of the present invention, but are covered by my copending application Serial No. 209,663 cited above.

Turning now to a consideration of the formation of the sump 24, it should be understood that it is of rather shallow pan construction having a bottom wall formed by the top surface of the removable end bell 34 as well as a cylindrical side wall 36 which rises to a short height above the motor. The sump is provided with a flat top surface 37 that includes a plurality of threaded inserts 38 imbedded therein for receiving fastening screws 39. Hence when a collar 40 is assembled over the hopper this collar may be drawn down toward the sump by means of the screws 39 for tightly clamping the assembly together.

Attention will now be given to the mold illustrated in FIGURE 2 in which the molded motor housing 28 is to be cast. The mold consists of two telescoping elements, namely, a center plug assembly 42 and an outer mold shell 43 that together form a mold cavity therebetween. The center plug assembly 42 is a precision part that has an enlarged base with an outwardly directed supporting flange 44, a raised crown 45, and a snug-fitting plug portion 46 which fits into the bore of the stator 27. Several diameters are turned on the center plug so as to create a narrow shoulder 47 therebetween for supporting the stator on the plug in an upside-down position. The shape of the plug portion 46 defines a cavity for receiving the rotor 31, while the crown portion 45 of the center plug assembly provides the cavity of the sump 24 of the disposer as best seen in FIGURE 1. The top of the center plug 42 has a raised cylindrical boss 48 which impresses in the bottom wall 29 of the motor housing a central bore for receiving a fixed bearing 32 which is the lower bearing of the motor.

The next feature to be discussed is the means for obtaining a smooth hole from the sump 24 through the side wall thereof to form a drain outlet 25. This invention proposes the use of a resilient insert 50 shown in FIGURE 2 which is slidably supported on the inner side wall of the outer mold shell 43 and compressed between said wall and the crown 45 of the center plug assembly 42. The insert 50 is adapted to be mounted in the mold shell 43 by sliding the insert into a mating pocket 51 in the side wall as best shown in the front elevational view of FIGURE 4 where the pocket is open adjacent the bottom edge of the mold shell 43 and extends vertically therefrom. The pocket is provided with a groove 52 that extends around the three upper sides of the pocket for receiving a like-shaped flange 54 of the insert. Other views of this groove 53 are shown in the vertical cross-section view of FIGURE 3 as well as in the bottom plan view of FIGURE 5 where the insert 50 is shown in place with its flange 54 positioned in the groove 53 of the pocket. Aside from the outer supporting portion of the insert, the insert has an innermost portion with a central protuberance 55 and a downwardly inclined tip 56 which is seated on the top edge and part of the side of the raised crown 45 of the center plug. Around this protuberance 55 is an annular space 57 which is established by a spaced cylindrical shoulder 58 to define a nozzle shape for the drain outlet 25 that extends outwardly from the side wall 36 of the sump 24. In other words, this space 57 is part of the mold cavity which is to be filled by the molding compound and when cured forms a drain nozzle 59. A coupling sleeve 49 is used to join the drain nozzle 59 to a drain pipe 35 leading to the sewer system. It should be appreciated that the insert 50 is first slipped into the mating pocket 51 of the mold shell 43 before the mold shell is lowered over the combined center plug 42 and stator 27, and in so doing the insert 50 is compressed first into the mold shell by means of the lower flange 44 of the center plug and finally between the side wall of the mold shell and the raised crown of the center plug.

The bottom wall 29 of the motor housing is defined by placing a mold plug 60 into the top opening of the outer mold shell 43. There is a central opening 61 in the top plug 60 as well as a narrow clearance 62 around the periphery of the top plug so that excess molding compound may flow freely from the mold. This method accurately defines the size and shape of the bottom wall 29, and any overflow represents flashings which can easily be machined off the casting so that the bottom surface of the casting has a finished appearance. Next, the mold is cured for a sufficient length of time and at a sufficiently high temperature so that the molding compound will harden and form a rigid casting. Finally, the casting is removed from the mold by first lifting off the outer mold shell 43 thereby separating the rubber insert 50 from the mold shell as the insert easily slides out of the groove 53 in the pocket 51. Next, the casting is lifted off of the center plug assembly thereby carrying the rubber insert 50 with the casting. Finally, the insert is removed from the casting by pushing the insert with a force from within the sump 24 until the insert snaps out of the drain outlet 25 thereby providing the finished casting that is shown in the assembly view of FIGURE 1. It should be understood that the motor is used in the right side up position which is the reverse of the position in which it is molded in FIGURE 6, for example.

Modifications of this invention will occur to those skilled in this art; therefore it is to be understood that this invention is not limited to the particular embodiments disclosed, but that it is intended to cover all modifications which are within the true spirit and scope of this invention as claimed.

What I claim as new and desire to secure by Letters Patent of the United States is:

1. A method of molding a combined motor housing and sump for a food waste disposer where the housing has a motor stator encapsulated therein, comprising the steps of positioning the stator over a center plug assembly, placing a resilient insert within an outer mold shell along one side wall thereof, said insert being capable of sliding removal from the shell, placing the outer mold shell over the combined stator and center plug assembly, the insert being compressed between an outer surface of the center plug and the inner surface of the mold shell, introducing a fluid molding compound into the mold, and curing the mold to transform the compound into a solid casting, removing the mold shell from the casting, the insert being held to the casting and thereby stripped from the mold shell, removing the casting from the center plug and finally removing the insert from the casting so that a drain opening is formed in the side wall of the sump.

2. A method of molding a hollow member with an opening through the side wall comprising the steps of providing a center plug assembly for defining the interior of the hollow member, providing an outer mold shell which is assembled over the center plug and defines a cavity therewith into which the molding compound is to be poured, there being a resilient insert assembled first along one side wall of the mold shell and being capable of sliding removal from the shell, the insert being compressed between the outer surface of the center plug and the inner surface of the mold shell, and introducing a fluid molding compound into the mold, curing the mold to transform the compound into a solid casting, removing the mold shell from the casting, the insert being held in the casting and thereby stripped from the mold shell, removing the center plug from the casting, and finally removing the insert from the casting to form an opening through the side wall of the casting.

3. A method of molding a hollow member with an opening through the side wall comprising the steps of providing a center plug assembly for defining the interior of the hollow member, providing an outer mold shell member which is assembled over the center plug and defines a cavity therewith into which molding compound is to be introduced, there being a resilient insert member assembled first along one side wall of the mold shell and being capable of sliding removal from the shell, one of said insert and mold shell members having flange means for sliding engagement within grooves in the other member, the insert being compressed between an outer surface of the center plug and the inner surface of the mold shell, introducing a fluid molding compound into a mold, and curing the mold to transform the compound into a solid casting, the removal of the mold shell from the casting causing the insert to slide out of the mold shell because the insert is held to the casting, then removing the casting from the center plug, and finally forcing the insert through the wall of the casting so that an opening is formed in the side wall thereof.

References Cited by the Examiner

UNITED STATES PATENTS

| 1,585,455 | 5/26 | Wood. | |
|---|---|---|---|
| 2,614,310 | 10/52 | James. | |
| 2,681,494 | 6/54 | Weber | 25—127 |
| 2,683,298 | 7/54 | Fadden. | |
| 2,714,226 | 8/55 | Axelrad. | |
| 3,064,310 | 11/62 | Cooprider | 264—313 |

FOREIGN PATENTS 16,872  3/34  Australia.

ROBERT F. WHITE, *Primary Examiner.*
ALEXANDER H. BRODMERKEL, *Examiner.*